United States Patent
Tsuyuki et al.

(10) Patent No.: US 6,407,392 B1
(45) Date of Patent: Jun. 18, 2002

(54) RADIATION DETECTOR

(75) Inventors: Akira Tsuyuki, Kanagawa-ken; Tatsuyuki Maekawa, Tokyo; Akio Sumita; Shunichiro Makino, both of Kanagawa-ken, all of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/549,034

(22) Filed: Apr. 13, 2000

(30) Foreign Application Priority Data

Jun. 4, 1999 (JP) .......................................... 11-158211

(51) Int. Cl.⁷ ................................................ G01T 1/20
(52) U.S. Cl. ........................ 250/368; 250/366; 250/367
(58) Field of Search ................................ 250/368, 367, 250/366

(56) References Cited

U.S. PATENT DOCUMENTS

| 5,391,878 A | 2/1995 | Petroff ......................... 250/367 |
| 5,442,179 A * | 8/1995 | Ohishi ......................... 250/368 |
| 5,471,062 A | 11/1995 | Gritzo et al. ................ 250/368 |

FOREIGN PATENT DOCUMENTS

| EP | 0 583 118 | 2/1994 |
| JP | 5-232284 | 9/1993 |

OTHER PUBLICATIONS

Yorimasa; "Radiation Detector and Radiation Monitor Using the Same"; Patent Abstracts of Japan; vol. 1999, No. 05; May 31, 1999; JP 11 044768; Feb. 16, 1999; Abstract.

* cited by examiner

Primary Examiner—Constantine Hannaher
Assistant Examiner—Andrew Israel
(74) Attorney, Agent, or Firm—Foley & Lardner

(57) ABSTRACT

A radiation detector for detecting radiation comprises a scintillator, a first light guide, a plurality of second light guides and a photo detector. The scintillator generates a scintillated light in response to received radiation. The first light guide, which is connected to the scintillator, has a fluorescence characteristic. The second light guide has a common surface arranged at the opposite side of the surface of the scintillator where radiation is received, and the second light guide has a fluorescence characteristic. The photo detector is connected to the first light guide and the second light guide, and detects a fluorescent light therein.

30 Claims, 11 Drawing Sheets

RADIATION DETECTOR

BACKGROUND OF THE INVENTION

1. Field of the Invention

The present invention relates to a radiation detector, and more particularly to a radiation detector for detecting one or two dimensional intensity distribution of radiation.

2. Discussion of the Background

An X-ray image receptor is used in a facility in which radiation is to be detected, such as a nuclear power plant. The basic structure of the X-ray image receptor and a method of detecting X-rays is described by referring to a perspective view shown in FIG. 1 of a conventional x-ray image receptor. A plate-like scintillator 1 fluoresces in response to received radiation. A plurality of fluorescent fibers 17, such as wavelength-shifting fibers, is arranged in two layers on the rear side of an X-ray reception surface of the scintillator 1. The two layers are arranged so that the fluorescent fibers 17 of one layer are perpendicular to the fluorescent fibers 17 of the other layer. This structure generates and outputs two-dimensional position information of radiation received by the scintillator 1. The fluorescent fibers 17 absorb scintillated light, and irradiate and transmit fluorescent light having a wavelength that is longer than that from the scintillator 1.

If the scintillated light is irradiated from the point of entry of radiation, the fluorescent fibers 17 absorb a part of the scintillated light, thereby fluorescing light. The fluorescent light is transmitted in the fluorescent fibers 17 and is detected by photo detectors (not shown) disposed at the end of the fluorescent fibers 17. The cross point of two fluorescent fibers, in which the fluorescent light is transmitted and detected, is identified as the entry point of radiation.

In the conventional scintillator, the fluorescent fibers 17 are densely arranged in order to achieve high resolution which is approximately equal to the diameter of the fluorescent fibers 17. However, if the number of the fluorescent fibers 17 is reduced and the interval thereof is sparse, the probability of reception of the scintillated light by the fluorescent fibers 17 is thereby reduced. Consequently, the probability of signal detection is lowered.

High resolution is required when detecting X-ray. However, when detecting the distribution of radioactive materials or the distribution of radiation intensity in a conventional nuclear power plant and the like, it is desirable to employ a radiation detector having lower resolution performance and a wider detection range in comparison to that of the X-ray image receptor. That is, although the X-ray image receptor shown in FIG. 1 is used for measuring a range defined by 10–30 millimeter edges, surface contamination inspection in nuclear power plants requires a range defined by 100–300 millimeter edges.

Assume that there exists a basic square having approximately 100 millimeter edges, and that there exists a certain range to be measured containing these basic squares. Here, if the conventional technique as shown in FIG. 1 is employed with sparse arrangement of the fluorescent fibers 17 by reducing the number thereof, practical sensitivity cannot be realized. By contrast, if the number of the fluorescent fibers 17 is increased to a dense arrangement, too many photo detectors and process circuits are required.

SUMMARY OF THE INVENTION

The present invention has been made in view of the above-mentioned circumstances and is intended to solve the above-mentioned problems. In particular, an object of the present invention is to provide a radiation detector capable of detecting radiation in a large area.

The present invention provides a radiation detector, including a scintillator that generates a scintillated light in response to received radiation on a first surface of the scintillator. A first light guide is connected to the scintillator, and has a fluorescence characteristic. Each of a plurality of second light guides has a common surface that is arranged at a second surface of the scintillator that is opposite the first surface. The second light guide has a fluorescence characteristic. A plurality of photo detectors is connected to the first light guide and the second light guide for detecting a fluorescent light therein.

The radiation detector may further include a signal processing unit that processes a signal generated by the photo detector in response to the detected fluorescent light.

The first light guide may be connected on the side edge of the scintillator, or may irradiate a fluorescent light which has a different wavelength from that of the scintillated light from the scintillator.

The second light guide may have a surface larger than that of the first light guide, and may be formed of a plate. The second light guide may have a major edge and a minor edge, and the minor edge defines a resolution of detection. The major edge of the second light guide may be approximately the same length as an edge of the scintillator.

The scintillator may have a surface in which the length of the edges thereof is approximately 600 millimeters, and the second light guide may have a surface in which the length of the edges thereof is approximately 100 millimeters and 600 millimeters.

A photo detector may be connected to an end of the first light guide and the second light guide, or may be connected to at least one end of the first light guide.

The radiation detector may further include a reflective material connected to the other end of the first light guide for preventing the leakage of the fluorescent light therefrom.

The first light guide may have a prismatic shape or a circular shape.

The first light guide may include an optical fiber. The scintillator may include a plurality of unit scintillators.

The radiation detector may further include a third light guide for connecting the unit scintillators to each other.

The third light guide may guide each scintillated light from the connected scintillators independently. The third light guide may include a reflective material. A photo detector may be connected to at least one end of the third light guide. The third light guide may be arranged parallel to the first light guide.

The first light guide and the third light guide may be arranged perpendicular to the second light guide. The detector may include a plurality of layers formed of the unit scintillator and the third light guide. The scintillators in the layers may be arranged parallel to each other.

The present invention further provides a radiation detector, including a first detecting layer having a plurality of first scintillators and a light guide. Each first scintillator generates a scintillated light in response to radiation received on a first surface. The light guide has a fluorescence characteristic and is connected to the scintillators. A second detecting layer is arranged on a second surface of the first detecting layer opposite the surface where radiation enters, and has a plurality of second scintillators and a plurality of second light guides. Each second scintillator generates a scintillated light in response to received radiation. The second light guide has a fluorescence characteristic.

The radiation detector may further include a photo detector connected to the light guide and the second light guide for detecting a fluorescent light therein.

The second scintillator may face the opposite side of the surface of the scintillator where radiation is entered, or the second light guide may face the opposite side of the surface of the scintillator where radiation is received.

BRIEF DESCRIPTION OF THE DRAWINGS

The accompanying drawings, which are incorporated in and constitute a part of this specification, illustrate several preferred embodiments of the present invention and, together with the description, serve to explain the principles of the present invention.

DESCRIPTION OF THE PREFERRED EMBODIMENTS

Preferred embodiments of a radiation detector of the present invention are specifically described in more detail with reference to the accompanying drawings. Wherever possible, the same reference numbers are used throughout the drawings to refer to the same or like parts.

Figure 1:
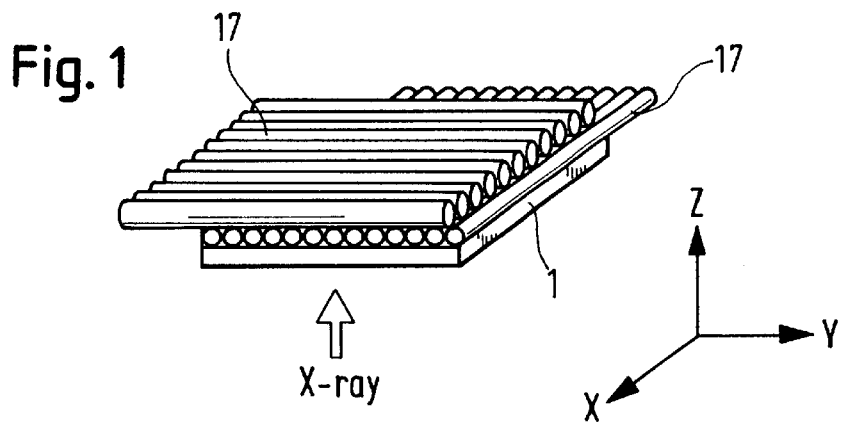
FIG. 1 is a perspective view showing a basic structure of a conventional X-ray image receptor.
Figure 2:
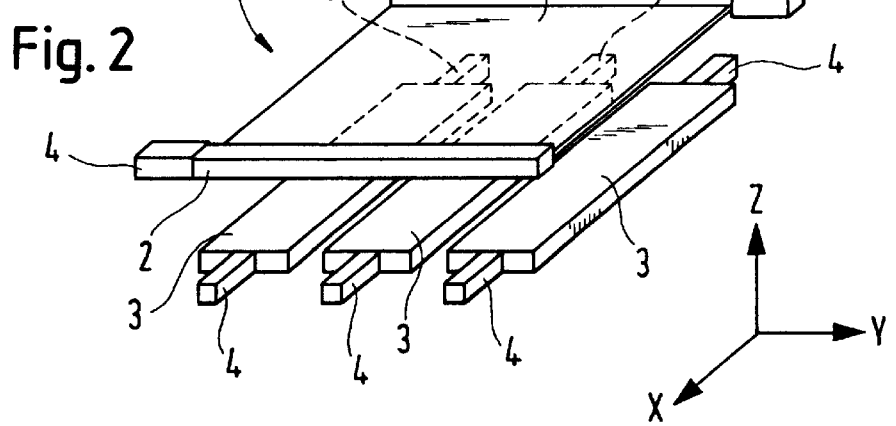
FIG. 2 is an exploded perspective view showing a position sensitive radiation detector according to a first embodiment of the present invention.

FIG. 2 is an exploded perspective view showing a position sensitive radiation detector according to a first embodiment of the present invention. Here, a position sensitive radiation detector is a kind of a radiation detector.

In FIG. 2, a radiation detector 100 includes a scintillator 1, a plurality of first light guides 2, a plurality of second light guides 3 and a plurality of photo detectors 4. The scintillator 1 is formed of a plate, and scintillates while receiving radiation. The first light guides 2 and the second light guides 3 include fluorescent materials.

The first light guides 2 are connected on two opposite edges of the scintillator 1. Radiation enters the top surface of the scintillator 1. The plurality of second light guides 3 is disposed adjacent the bottom surface of the scintillator 1, and is arranged in a Y-axis direction parallel to the scintillator 1. In this illustrative embodiment, the radiation detector 100 includes three second light guides 3. As shown in the FIG. 2, the second light guide 3 has a major edge (in an X-axis direction), approximately the same length as that of the first light guide 2, and a minor edge (in a Y-axis direction), approximately one third of the length of the major edge, and the main surface of the second light guide 1 defined by these edges is larger than that of the first light guide 2. For example, the scintillator 1 may have 600 millimeter edges, and the second light guide 3 may have a 600 millimeter edge and a 200 millimeter edge, respectively. Other than this, the second light guide 3 may also have a 600 millimeter edge and a 100 millimeter edge, respectively. The photo detectors 4 are connected on both ends of the first light guides 2 and the second light guides 3. The photo detector 4 may be, for example, a photo-electric multiplication tube (PMT).

Note that output signals from the photo detectors 4 can be processed by using a signal processing unit, described below.

The operation of detecting radiation by using the radiation detector of the present invention is explained hereinafter.

In response to radiation entering the scintillator 1, light is scintillated in the scintillator 1. This scintillated light passes through the scintillator 1, and is separated into two components: an internal transmission light, which is absorbed by the first light guide 2, and an external irradiation light, which is irradiated when the scintillator 1 scintillates.

The internal transmission light enters the first light guides 2, which then generates fluorescent light. This fluorescent light is retained and transmitted in the first light guides 2, and is guided to the photo detectors 4 connected to the ends of the guides 2. The external irradiation light that is not captured by the scintillator 1 enters the second light guides 3 below the scintillator 1, thereby fluorescing light. The fluorescent light generated by the second light guide 3 is retained and diffused in the second light guides 3, and is guided to the photo detectors 4 connected to the ends thereof.

The scintillated light generated anywhere in the scintillator 1 is detected by the first light guides 2 connected to the edges thereof. However, the external irradiation light is always irradiated from a point where the scintillated light is generated, and is detected by one of the second light guides 3 aligned in the Y-axis direction. Accordingly, the minor edge of each second light guide 3 defines the resolution of the radiation detector 100 along the Y-axis direction. Accordingly, positional information of the scintillation point along Y-axis direction is detected by considering the simultaneity of signals detected by the scintillator 1 and the second light guides 3.

In one embodiment, the scintillator 1 is made of plastic and is a plate. The first light guide 2 and the second light guide 3 are made of a resin containing a fluorescent material such as a wavelength shifter, or are made of optical fibers. The wavelength of the fluorescent light from the first light guide 2 and the second light guide 3 is changed from that of the scintillated light from the scintillator 1 due to the wavelength shifter.

In one embodiment, the first light guide 2 is formed by polishing the resin containing the wavelength shifter into a prismatic shape. The first light guide 2 having such shape has less flexibility than that of the optical fiber having a cylindrical shape; however, it has the simplicity of being formable to an arbitrary thickness. Further, because the first light guide 2 is surrounded by air which has a refractive index that is much different from the refractive index of resin, high efficiencies of trapping and transference of light in the scintillator can be achieved. Moreover, the first light guide 2 can be thickened in order to improve the transform probability of fluorescence of the scintillated light. In an environment that has a constraint such as shape of the scintillator 1, position of the photo detector 4 or the like, an optical fiber can be used as the first light guide 2.

The wavelength band of scintillation of the scintillator 1 and the wavelength band of absorption of the wavelength shifter preferably overlap each other. Some part of the fluorescent light from the first light guides 2 and the second light guides 3 is retained therein and is transmitted to the edges; therefore, the photo detectors 4 disposed on the edges can detect the scintillated light and the fluorescent light.

Some kinds of wavelength shifters and optical fibers containing thereof are available for manufacturing a scintillator that scintillates around the wavelength of 400 nanometers. For example, model number "BC-482" from Bicron Inc. and model number "Y-7" from Kuraray Inc. are typical wavelength shifters.

An optical binder may be used to connect the first light guide 2 and the second light guide 3 to the photo detector 4. Optical binders prevent air between the light guides 2 and 3 and the photo detectors 4, and hence reduce reflection loss. Further, a reflecting material may be applied or disposed on open edges of the scintillator 1, or ends of the first light guides 2 and the second light guides 3. This efficiently holds collected scintillated light and collected fluorescent light.

Figure 3:
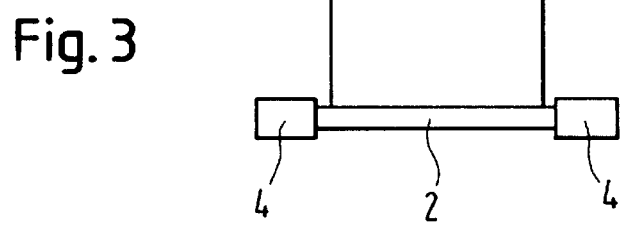
FIG. 3 is a top plan view showing an example of the arrangement of photo detectors according to the first embodiment of the present invention.

Some examples of other arrangements of the photo detectors 4 are illustrated in FIGS. 3 to 9 according to the first embodiment of the present invention. Here, FIGS. 3 to 7 are top plan views, and FIGS. 8 and 9 are side views, respectively. In one embodiment, the optical detectors 4 are connected to both ends of each of the first light guides 2, as shown in FIG. 3. In one embodiment, detection efficiency is improved, although the number of optical detectors 4 increases.

Figure 4:
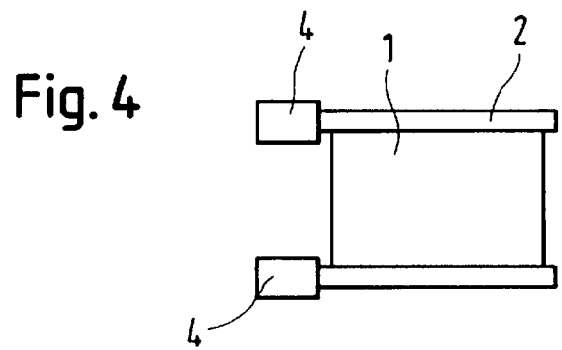
FIG. 4 is a top plan view showing an example of the arrangement of photo detectors according to the first embodiment of the present invention.
Figure 5:
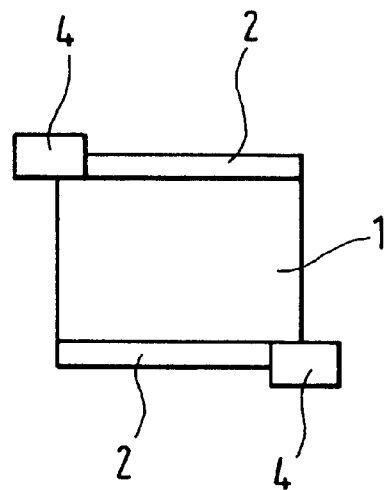
FIG. 5 is a top plan view showing an example of the arrangement of photo detectors according to the first embodiment of the present invention.
Figure 6:
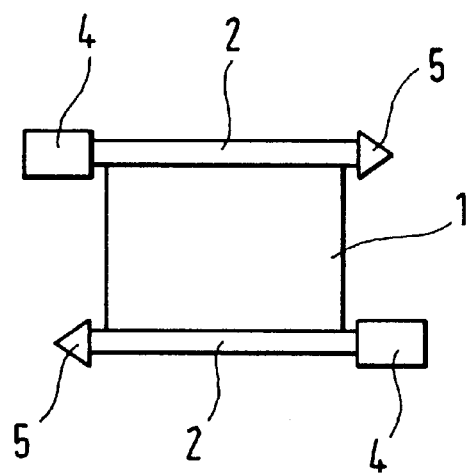
FIG. 6 is a top plan view showing an example of the arrangement of photo detectors according to the first embodiment of the present invention.
Figure 7:
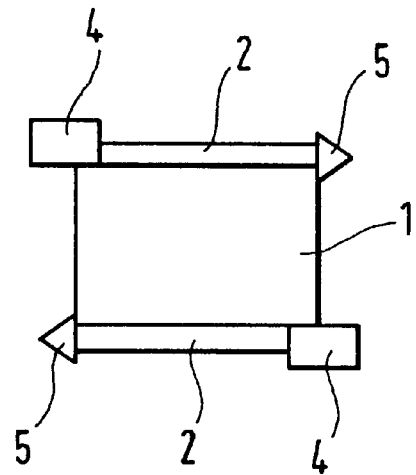
FIG. 7 is a top plan view showing an example of the arrangement of photo detectors according to the first embodiment of the present invention.

Referring to FIGS. 4 and 5, the optical detectors 4 may be connected to one end of each of the first light guides 2. In this case, the other ends of the first light guides 2 may include reflective materials 5 for reflecting collected scintillated light, as shown in FIGS. 6–7, for preventing the leakage of the fluorescent light therefrom and thereby retaining the collected fluorescent light. The reflective material 5 may be, for example, a mirror surface reflector, such as a vacuum evaporated aluminum sheet, or a diffused surface reflector, such as titanium oxide and magnesium oxide.

Referring again to FIG. 5, the length of the first light guides 2 is shorter than the length of the side edge of the scintillator 1, and the photo detectors 4 are disposed. Considering room for the packaging of the radiation detector, it is sometimes desired to use such a structure. In this case, a reduction rate "F" of the collected scintillated light is estimated by:

$$F = 1 - A/B$$

Here, the term "A" represents the length of the first light guide 2 in contact with the side edge of the scintillator 1, and "B" represents the length of the side edge of the scintillator 1. Reflective materials 5 may be coupled to the first light guides 2, as shown in FIG. 7.

Figure 8A:
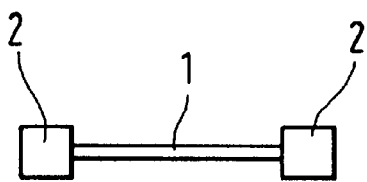
FIGS. 8A and 8B are side views showing examples of the arrangement of photo detectors according to the first embodiment of the present invention.
Figure 8B:
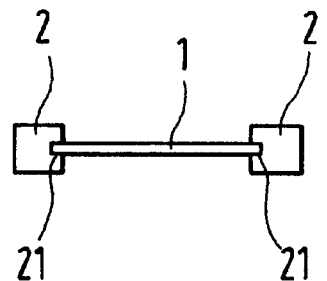

Moreover, the scintillator 1 may be connected to the first light guide 2 in other ways. In the case of the first light guide 2 having a difference of refraction index relative to air as shown in FIG. 2, some modifications can be considered. For example, the scintillator 1 and the first light guides 2 are simply connected as shown in FIG. 8A, or grooves 21 are formed in the first light guides 2 and the scintillator 1 is fit in the grooves 21 as shown in FIG. 8B. The latter example is advantageous to fix the scintillator 1 accounting for the packaging.

Figure 9A:
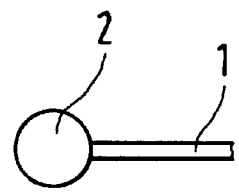
FIGS. 9A, 9B and 9C are sectional views showing examples of the arrangement of photo detectors according to the first embodiment of the present invention.
Figure 9B:
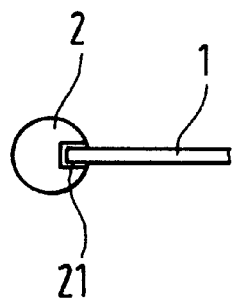
Figure 9C:
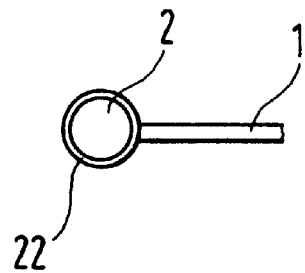

As noted above, the first light guide 2 is not limited to a prismatic shape, and may have a circular shape as shown in FIGS. 9A and 9B. In FIG. 9A, the edge of the scintillator 1 is connected to the surface of the first light guide 2. In FIG. 9B, a groove 21 is formed in the first light guide 2 and the scintillator 1 is disposed in the groove 21. Further, the first light guide 2 may be formed of an optical material that is coated by a clad 22, as shown in FIG. 9C.

Figure 10:
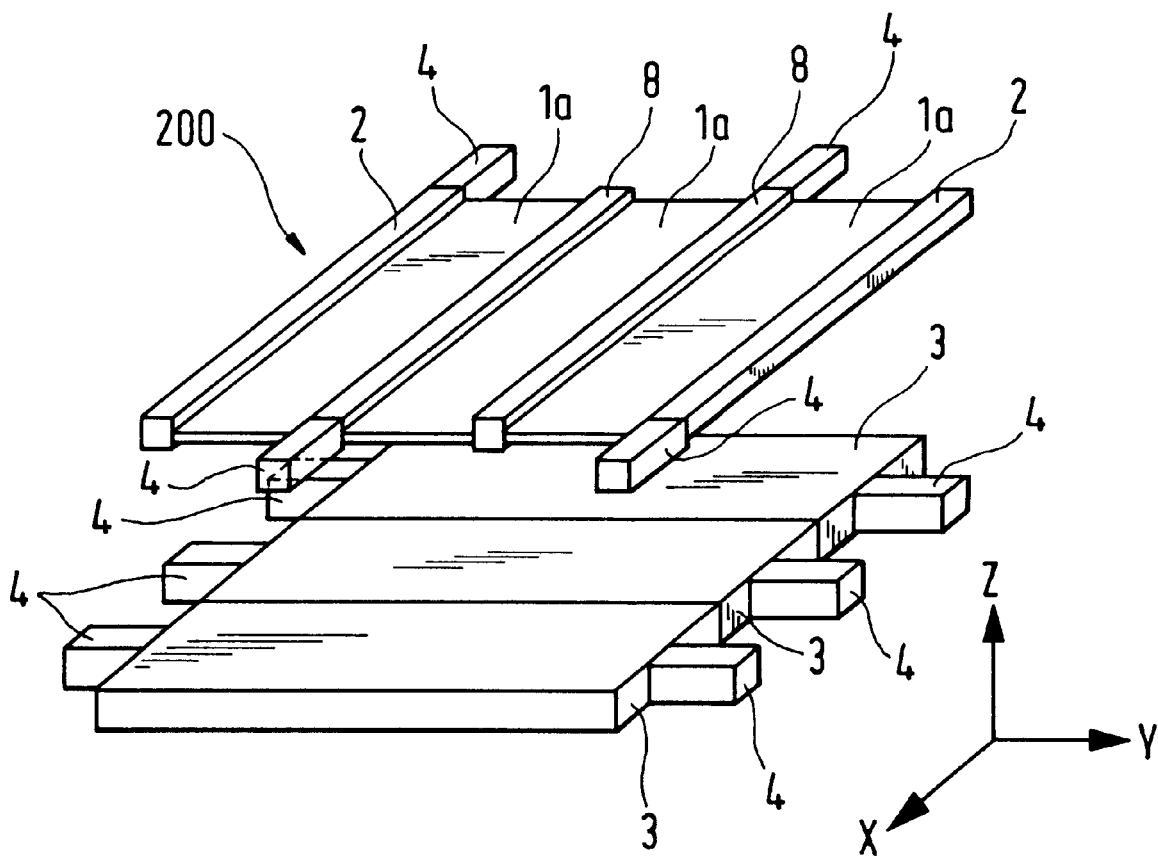
FIG. 10 is an exploded perspective view showing a position sensitive radiation detector according to a second embodiment of the present invention.

FIG. 10 is an exploded perspective view showing a position sensitive radiation detector according to a second embodiment of the present invention. In this embodiment, a scintillator 1a having a different shape is employed instead of the scintillator 1 of the first embodiment. In FIG. 10, a radiation detector 200 includes a plurality of unit scintillators 1a, the first light guides 2, the second light guides 3, the photo detectors 4 and a plurality of third light guides 8. Each unit scintillator 1a is formed of a plate, and fluoresces while receiving radiation. The first light guides 2, the second light guides 3 and the third light guide 8 include fluorescent materials.

Three unit scintillators 1a are arranged in the same plane, and the first light guides 2 are connected to outer edges of the unit scintillators 1a. The third light guides 8 are connected to inner edges of the unit scintillators 1a so as to fix the unit scintillators 1a next to each other. The second light guides 3 are arranged adjacent the bottom surface of the unit scintillators 1a. The second light guides 3 are arranged in the same plane and are parallel to the unit scintillators 1a, and the elongated direction thereof are arranged perpendicular to the elongated direction of the unit scintillators 1a. The photo detectors 4 are connected to the ends of the first light guides 2, the second light guides 3 and the third light guides 8.

Thus, the unit scintillators 1a and the second light guides 3 form a matrix having three rows and three columns. By confirming simultaneity of detected signals from the photo detectors 4 on the first light guides 2 and the third light guides 8 connected to the unit scintillators 1a, together with that on the second light guides 3, nine regions may be distinguished for recognizing the position of the scintillation point.

Figure 11:
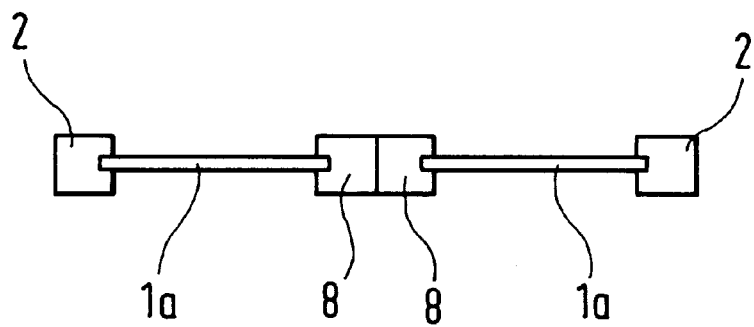
FIG. 11 is a side view showing an example of the arrangement of first and third light guides and unit scintillators of a position sensitive radiation detector according to the second embodiment of the present invention.
Figure 12:
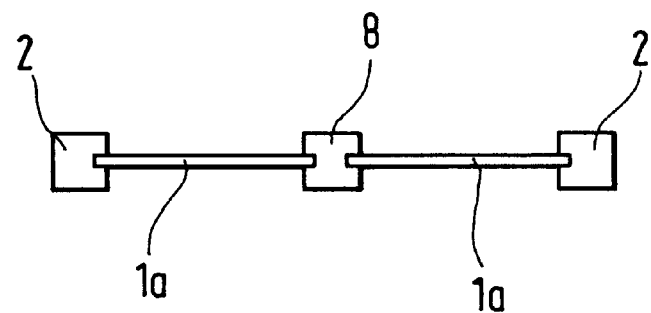
FIG. 12 is a side view showing an example of the arrangement of the first and the third light guides and the unit scintillators of a position sensitive radiation detector according to the second embodiment of the present invention.

FIGS. 11 and 12 are side views showing examples of the arrangement of the first and the third light guides 2 and 8, respectively, and the unit scintillator 1a. A plurality of unit scintillators 1a may be arranged so that the first guide 2 and the third light guide 8 are connected on each side edge of the unit scintillators 1a, as shown in FIG. 11. Specifically, a third light guide 8 is disposed on the side edge of each unit scintillator 1a, and corresponding third light guides 8 of adjacent unit scintillators 1a are abutted together.

FIG. 12 is a side view showing a position sensitive radiation detector having an arrangement such that fluorescent light caused by scintillation of two unit scintillators 1a is collected and transferred by a third light guide 8 that is shared in common by the two scintillators 1a. In the case of considering the relationship between a sectional area of the third light guide 8 and a receiving area of the photo detector 4, the fluoresced light of the third light guide 8 may be received with greater efficiency, and the number of photo detectors 4 may be reduced.

Figure 13:
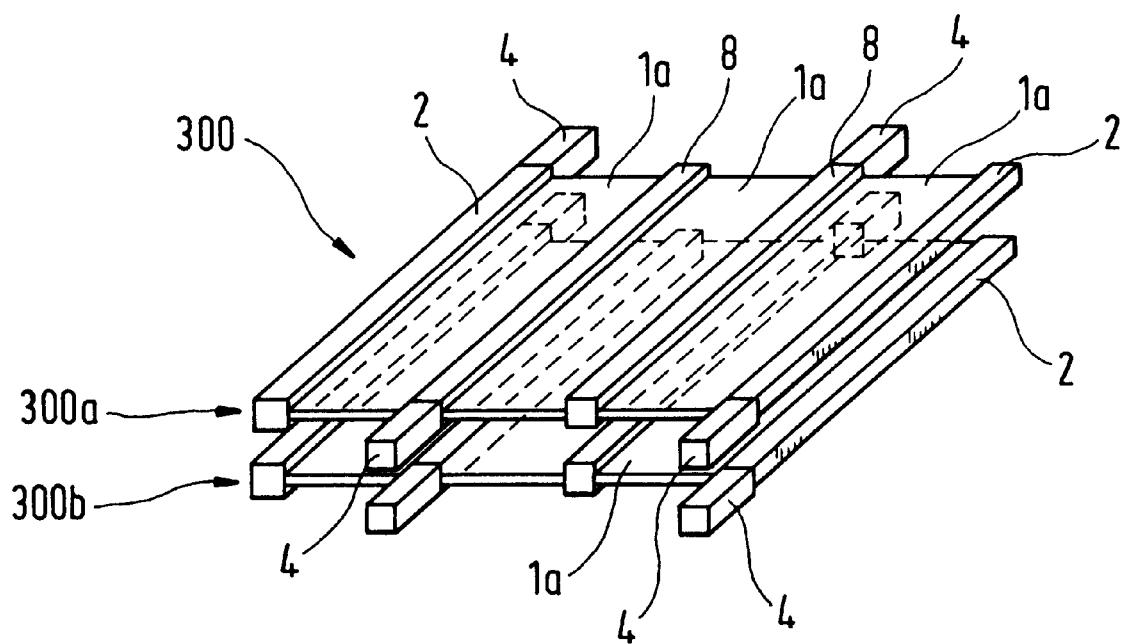
FIG. 13 is an exploded perspective view showing a position sensitive radiation detector according to a third embodiment of the present invention.

FIG. 13 is an exploded perspective view showing a position sensitive radiation detector according to a third embodiment of the present invention. A radiation detector 300 has a double-layer structure that includes a first layer 300a and a second layer 300b. The first layer 300a and the second layer 300b include the unit scintillators 1a and the first and the third light guides 2 and 8, as shown in FIG. 10, and are aligned in the same direction.

It is well known that each type of radiation, such as alpha ray, beta ray and the like, has a distinctive energy loss. Therefore, each of the multiple scintillator layers can detect different types of radiation. According to the third embodiment, different types of radiation may be detected in the first layer and in the second layer, in addition to one dimensional position detection of the scintillated point.

Figure 14:
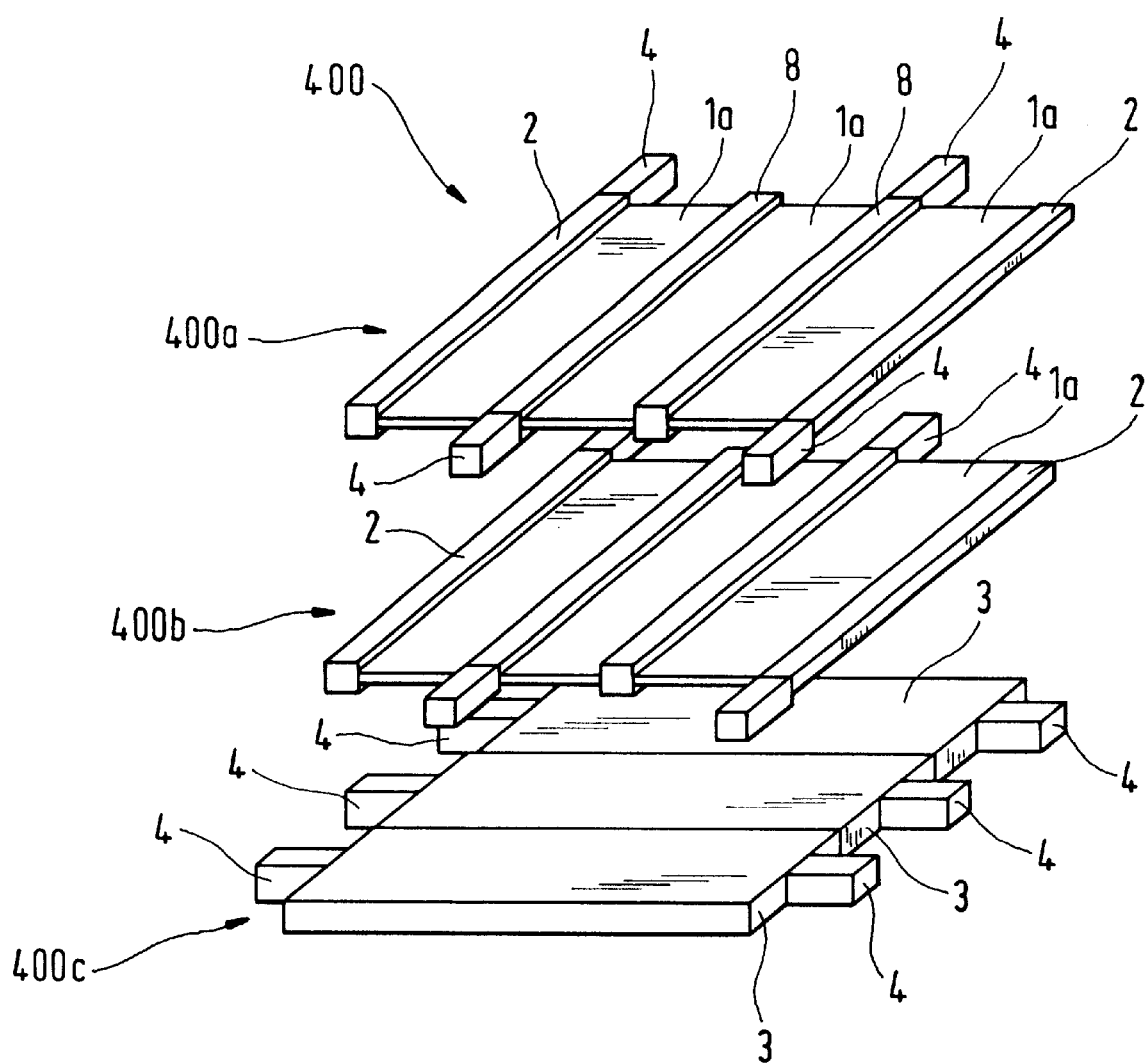
FIG. 14 is an exploded perspective view showing a position sensitive radiation detector according to a fourth embodiment of the present invention.

FIG. 14 is an exploded perspective view showing a position sensitive radiation detector according to a fourth embodiment of the present invention. In this embodiment, the radiation detector 400 has a triple-layer structure. That is, a first layer 400a and a second layer 400b have the same structure as the first layer 300a and the second layer 300b shown in FIG. 13, and a third layer 400c is further disposed thereto. The third layer 400c includes three second light guides 3. Although all the unit scintillators 1a of the first and second layers 400a and 400b are aligned in the same direction, the second light guides 3 of the third layer 400c are aligned perpendicular to the scintillators 1a of the first and second layers 400a and 400b. A photo detector 4 is connected to both ends of each of the second light guides 3 of the layer 400c.

According to the fourth embodiment, the third layer 400c operates, together with either of the first layer 400a and the second layer 400b, to detect two dimensional positional information of the scintillated point, similar to the embodiment shown in FIG. 10. Consequently, it is not necessary to increase the thickness shown in FIG. 10 up to double, and is possible to operate the third layer 400c with the first layer 400a and the second layer 400b in common. Moreover, it is also possible to correct and compensate the background data. ("Background data" is described below.)

Figure 15:
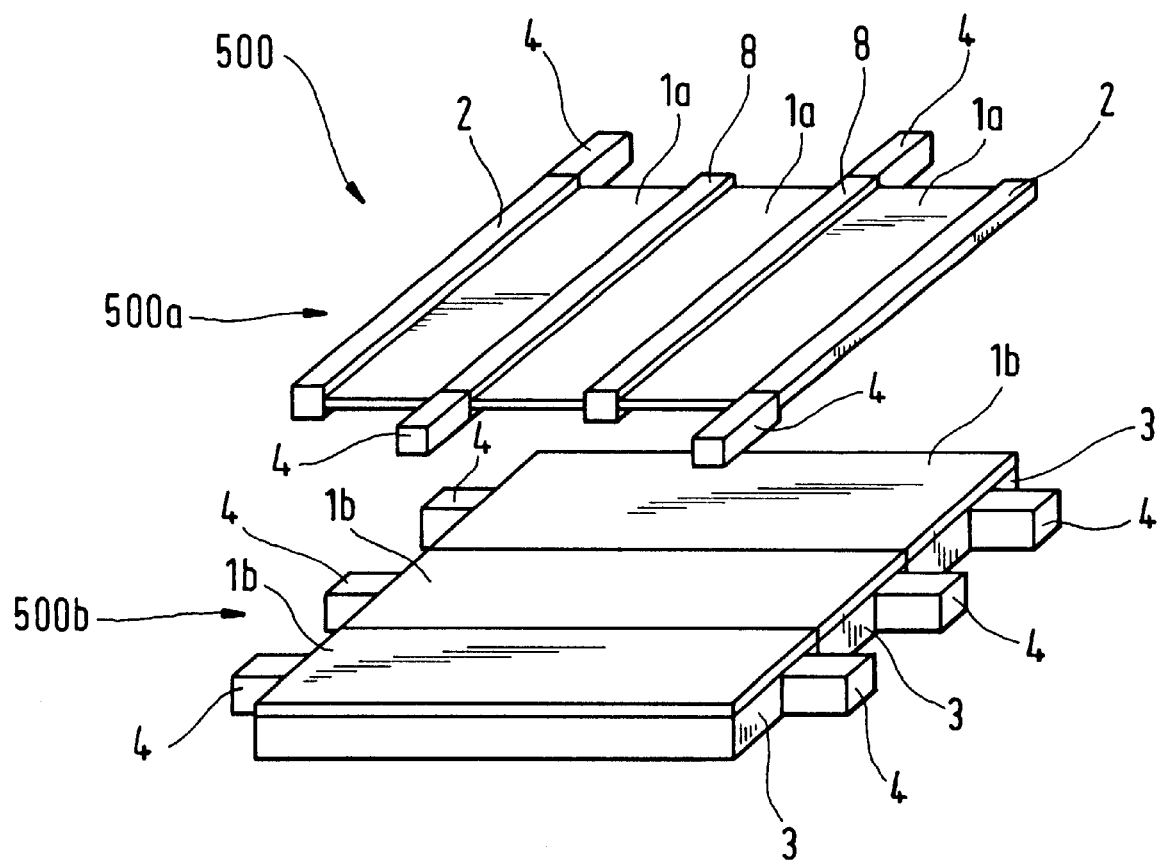
FIG. 15 is an exploded perspective view showing a position sensitive radiation detector according to a fifth embodiment of the present invention.

FIG. 15 is an exploded perspective view showing a position sensitive radiation detector according to a fifth embodiment of the present invention. The radiation detector 500 as shown in FIG. 15 has a similar structure as the radiation detector 200 shown in FIG. 10. The radiation detector 500 includes first and second layers 500a and 500b, respectively. However, a second scintillator 1b formed of a plate is fixed on the top surface of each second light guide 3 in the second layer 500b, and the second scintillators 1b are arranged to face the bottom surface of the first layer 500a.

In this structure, the second light guides 3 in the second layer 500b generate fluorescent light when the external irradiation light from the unit scintillators 1a in the first layer 500a enters the second layer 500b. Further, the second scintillators 1b in the second layer 500b generate scintillated light when radiation directly enters the second layer 500b.

Because the second layer 500b includes scintillators 1b and the light guides 3, one dimensional background data may be corrected and compensated by considering the difference of type and energy of radiation. Further, because the second layer 500b can detect different light, such as radiation and the external irradiation light, the number of parts of the apparatus may be reduced to simplify the structure thereof.

According to the fifth embodiment, one dimensional background data may be corrected and compensated, and two-dimensional detection of radiation may be performed in a simple structure.

Figure 16:
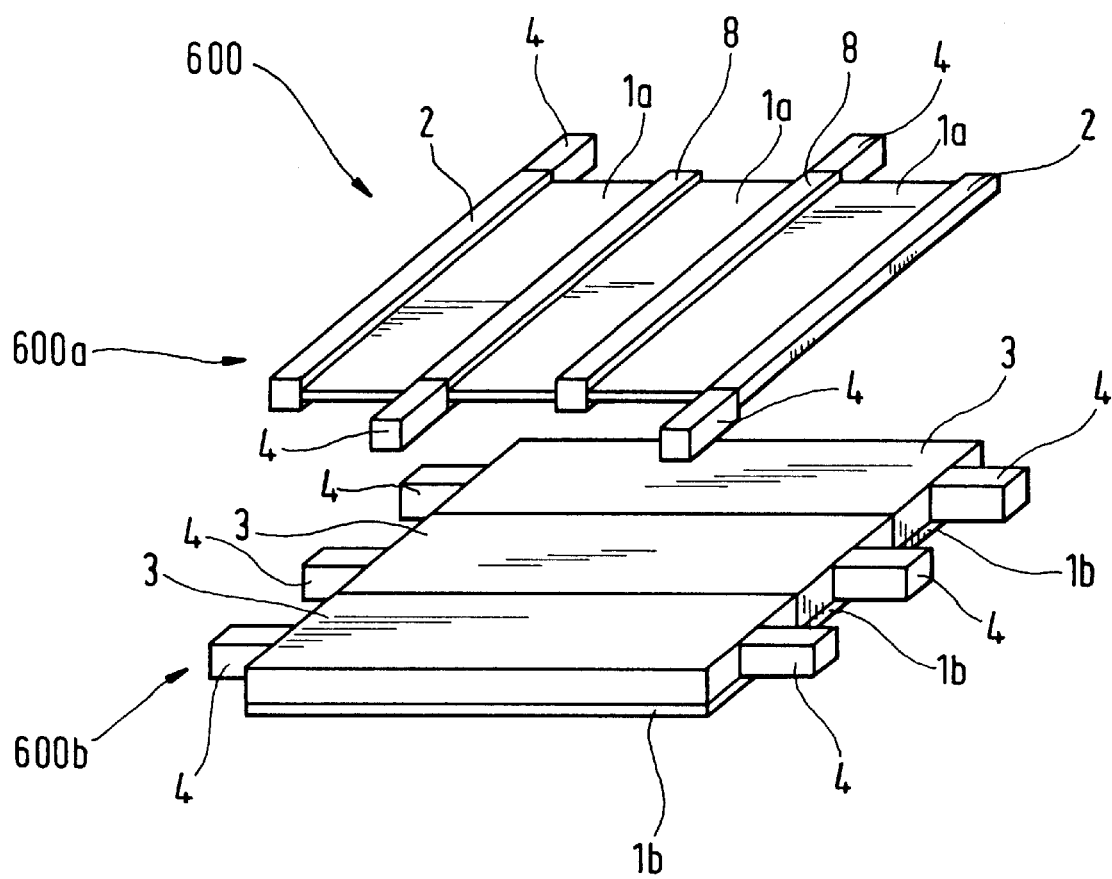
FIG. 16 is an exploded perspective view showing a position sensitive radiation detector according to a sixth embodiment of the present invention.

FIG. 16 is an exploded perspective view showing a position sensitive radiation detector according to a sixth embodiment of the present invention. Similar to the fifth embodiment as shown in FIG. 15, a radiation detector 600 of this embodiment includes the second scintillators 1b disposed on the surface of the second light guides 3. However, the second scintillators 1b are disposed on the bottom surface of a second layer 600a, i.e., the surface of the second light guides 3 that is opposite to the case shown in FIG. 15. In this embodiment, because the second light guides 3 are disposed between the scintillators 1a in the first layer 600a and the scintillators 1b in the second layer 600b, the degree of transmission of radiation of the second layer 600a provides a different value compared to that of the second layer 500b shown in FIG. 15.

Assume that there is a mixed field of radiation, such as an alpha ray and a beta ray. In the case of FIG. 15, it is supposed that a ray loses a portion of its energy while passing through the unit scintillator 1a in the first layer 500a, and the remaining energy is lost while passing through the second scintillator 1b in the second layer 500b. If a beta ray having enough energy to pass through the unit scintillator 1a in the first layer 500a enters the detector, it is probable that the beta ray may be determined and counted by both the unit scintillator 1a in the first layer 500a and the second scintillator 1b in the second layer 500b. However, if the second light guides 3 are disposed between these scintillators 1a and 1b as shown in FIG. 16, energy of the beta ray is lost in the second light guides 3 without involving fluorescing thereof. Therefore, if the thickness of the second light guides 3 is adjusted so that all the remaining energy of the beta ray, which was not lost in the unit scintillator 1a in the first layer 500a, is collected and lost in the second light guide 3, all of the beta ray may be shielded by the second light guide 3 and may not reach the second scintillator 1b. Such technique can be employed and, hence, any of the structure shown in FIG. 15 or 16 can be selected by considering correction and compensation of the background data.

Figure 17:
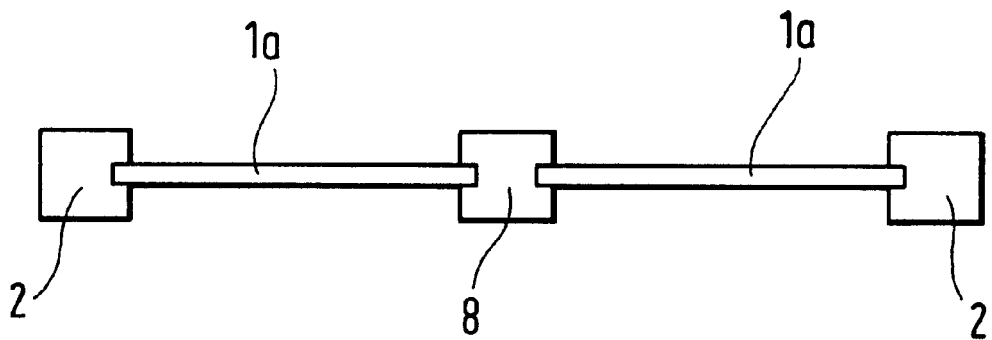
FIG. 17 is a side view showing an example of the arrangement of the first and third light guides and unit scintillators of a position sensitive radiation detector according to a seventh embodiment of the present invention.
Figure 18:
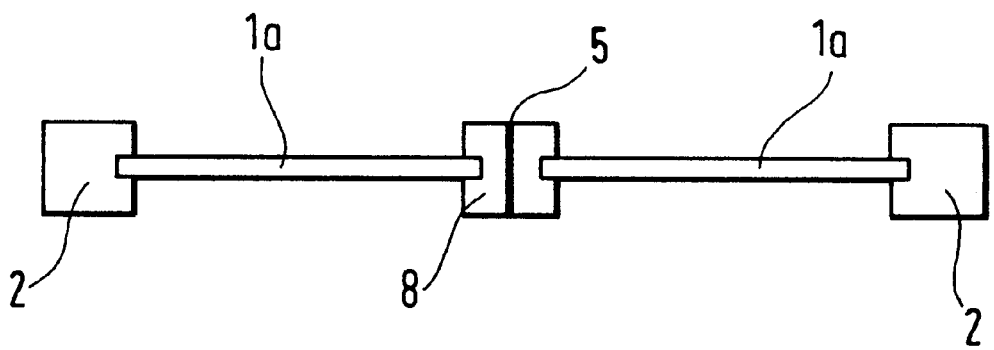
FIG. 18 is a side view showing an example of the arrangement of the first and third light guides and unit scintillators of a position sensitive radiation detector according to an eighth embodiment of the present invention.
Figure 19:
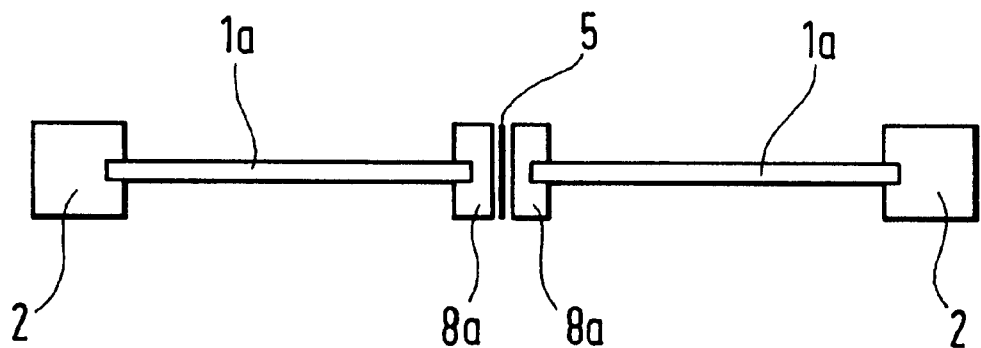
FIG. 19 is a side view showing an example of the arrangement of the first and third light guides and unit scintillators of a position sensitive radiation detector according to a ninth embodiment of the present invention.

FIGS. 17 to 19 are side views showing arrangement of the first and the third light guides and the unit scintillators of a position sensitive radiation detector according to respective seventh, eighth, and ninth embodiments of the present invention. The structure of the third light guide 8, as shown in FIG. 17, does not separate two unit scintillators 1a connected thereto optically.

Although it is unlikely, it is possible that the scintillated light from the unit scintillator 1a on the left in FIG. 17 may not be absorbed completely by the third light guide 8, and the scintillated light is then transmitted to the unit scintillator 1a on the right. In this case, the first light guide 2 on the right may determine that the detected scintillated light from the unit scintillator 1a on the left is generated by the unit scintillator 1a on the right.

Accordingly, the apparatus includes the reflective material 5 in the third light guide 8 for blocking the light therein to avoid light transmission between unit scintillators 1a, as shown in FIG. 18. The two unit scintillators 1a may be separated optically, and each scintillated light may be guided from the two scintillators 1a independently. The reflective material 5 may be, for example, a mirror surface reflector, such as a vacuum evaporated aluminum sheet, or a diffused surface reflector, such as titanium oxide and magnesium oxide.

However, the process for inlaying the reflective material 5 in the third light guide 8 may be inefficient due to the difficulty of manufacturing. For that reason, it may be preferable to use two light guides 8a, each having one-half thickness compared to the thickness of the first light guide 2, and the reflective material 5 is disposed between those light guides 8a, as shown in FIG. 19. This process of manufacturing the detector shown in FIG. 19 may be easier to perform than the process of manufacturing the detector shown in FIG. 17.

According to the eighth and ninth embodiments, a radiation detector is provided that avoids misdetection of scintillated light from the other unit scintillator.

Figure 20:
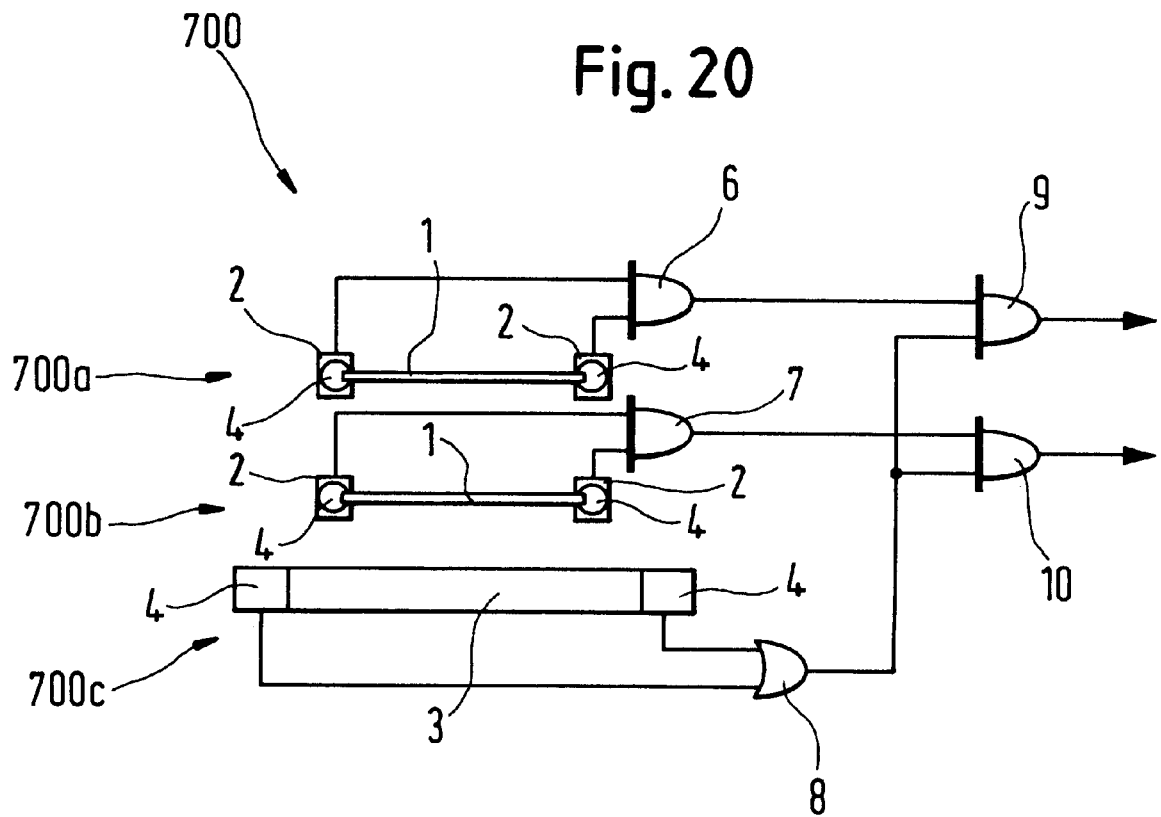
FIG. 20 is a block diagram showing a first embodiment of a signal processing unit.

FIG. 20 is a block diagram showing a first embodiment of a signal processing unit. Here, the signal processing unit is capable of applying to the above-described position sensitive radiation detectors of the present invention. Hereinafter, an AND process unit is defined that it calculates logical products of an input signal, and outputs "true" if any signal is detected or output simultaneous with the input signal. Similarly, an OR process unit is defined that it calculates logical sums of an input signal, and outputs "true" only when any signal is detected or output. Further, an inversion process unit is defined that it inverses logic of a signal, and outputs "false" when any signal is detected or output, or output "true" when no signals are detected.

In an illustrative embodiment, the radiation detector 700 shown in FIG. 20 has a three-layered structure as shown in FIG. 14, but other numbers of layers may be used. The radiation detector 700 includes a first layer 700a, a second layer 700b and a third layer 700c.

In FIG. 20, each of the first light guides 2, disposed on the side edge of the scintillator 1 in the first layer 700a, includes one photo detector 4, as shown in FIGS. 5 to 7. A first AND process unit 6 is connected to these photo detectors 4 to receive output signals therefrom.

Similarly, each of the first light guides 2, disposed on the side edge of the scintillator 1 in the second layer 700b, includes one photo detector 4, and a second AND process unit 7 is connected to these photo detectors 4 to receive output signals therefrom.

An output signal from the first AND process unit 6 indicates incidence of radiation and the time thereof at the scintillator 1 in the first layer 700a, and output signals from the second AND process unit 7 indicate incidence of radiation and the time thereof at the scintillator 1 in the second layer 700b. Signals from the photo detectors 4 and the function of these AND process units 6 and 7 indicate that any of the scintillators 1 in the first layer 700a or the second layer 700b detects radiation.

In FIG. 20, two photo detectors 4 are connected to the second light guide 3. If the scintillated light generated by the scintillator 1 in the second layer 700b enters the second light guide 3, the fluorescent light is then generated. The output signals from the second light guide 3, which represent the fluorescent light, are applied to the first OR process unit 8. Output signals from the first OR process unit 8 indicate that a fluorescent light is generated in the second light guide 3. Note that the AND process unit 6 is used because the first light guides 2 in the first layer 700a are shared by other adjacent scintillators, as shown in FIG. 14. However, an OR process can be used instead because these second light guides 3 are optically independent.

The scintillator 1 in the first layer 700a and the scintillator 1 in the second layer 700b are disposed along a same direction. The second light guides 3 in the third layer 700c are disposed perpendicular to the scintillators 1. Thereby, these scintillators and the second light guides form a matrix with rows and columns. Therefore, positional recognition thereof is expressed as:

(number of scintillator per layer)×(number of second light guide).

Accordingly, by applying output signals from the first AND process unit 6 and the first OR process unit 8 to a third AND process unit 9, scintillated light which is generated at a crossing area defined by the scintillator 1 in the first layer 700a and the corresponding second light guide 3 in the third layer 700c, and correspondingly the incidence of radiation, can be detected. Similarly, by applying output signals from the second AND process unit 7 and the first OR process unit 8 to a fourth AND process unit 10, incidence of radiation having information in the scintillator 1 in the second layer 700b can be detected.

Figure 21:
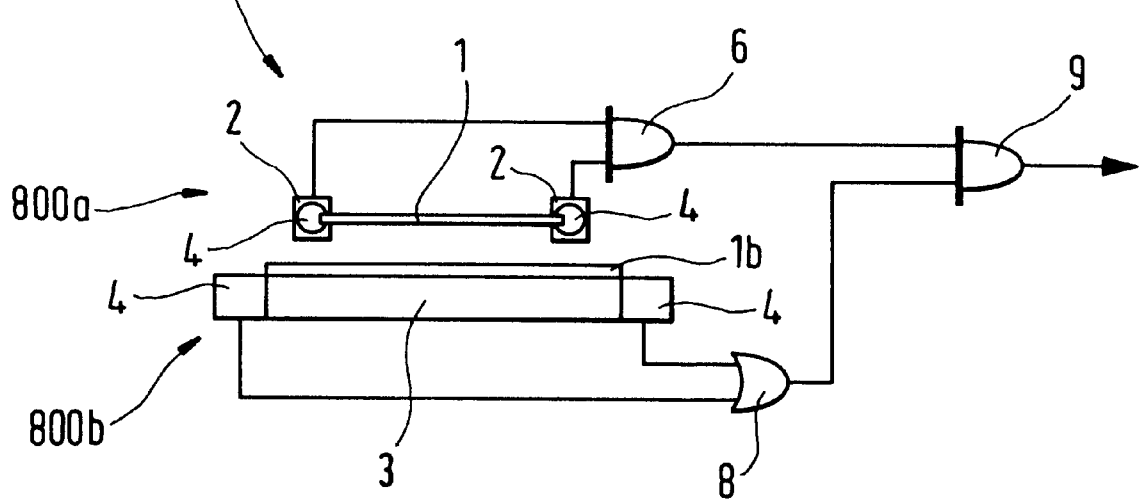
FIG. 21 is a block diagram showing a second embodiment of a signal processing unit.

FIG. 21 is a block diagram showing a signal processing unit according to a second embodiment of the present invention. In FIG. 21, the photo detectors 4 are connected to each end of the first light guide 2 disposed on the edge of the scintillator 1 in a first layer 800a, as shown in FIGS. 5 to 7.

Output signals from two photo detectors 4 are applied to a first AND process unit 6, and output signals from the first AND process unit 6 indicate incidence of radiation and the time thereof at the scintillator 1 in the first layer 800a. This arrangement of the photo detectors 4 allows the first AND process unit 6 to determine that the output signals are generated by the scintillator 1 disposed between two first light guides 2 in the first layer 800a.

As shown in FIG. 21, two photo detectors 4 are connected to the edge of the second light guide 3. The fluorescent light generated by the second light guide 3 in response to scintillated light from the second scintillator 1b, is detected by applying output signals from the photo detectors 4 to the first OR process unit 8. By analyzing output signals from the first OR process unit 8, the fluorescent light generated by the second light guide 3 can be detected.

The second light guide 3 is arranged perpendicular to the scintillator 1 in the first layer 800a, and thereby forming a matrix of rows and columns. Therefore, positional recognition thereof is expressed as:

(number of scintillator per layer)×(number of second light guides).

Accordingly, by applying output signals from the first AND process unit 6 and the first OR process unit 8 to a third process unit 9, scintillated light which is generated at an intersection area defined by the scintillator 1 and the corresponding second light guide 3, and correspondingly the incidence of radiation, can be detected.

Figure 22:
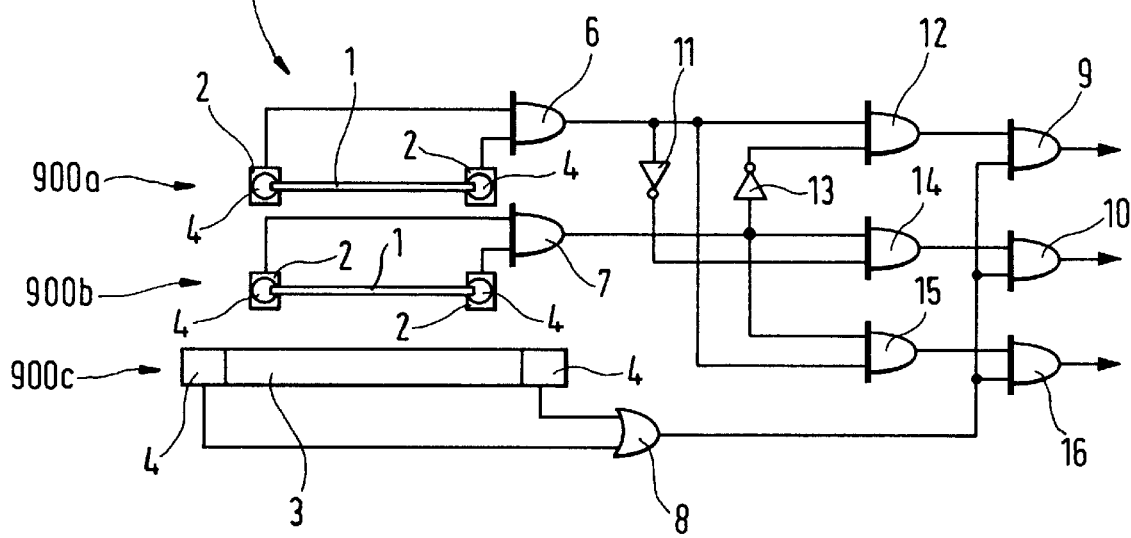
FIG. 22 is a block diagram showing a third embodiment of a signal processing unit.
Figure 23:
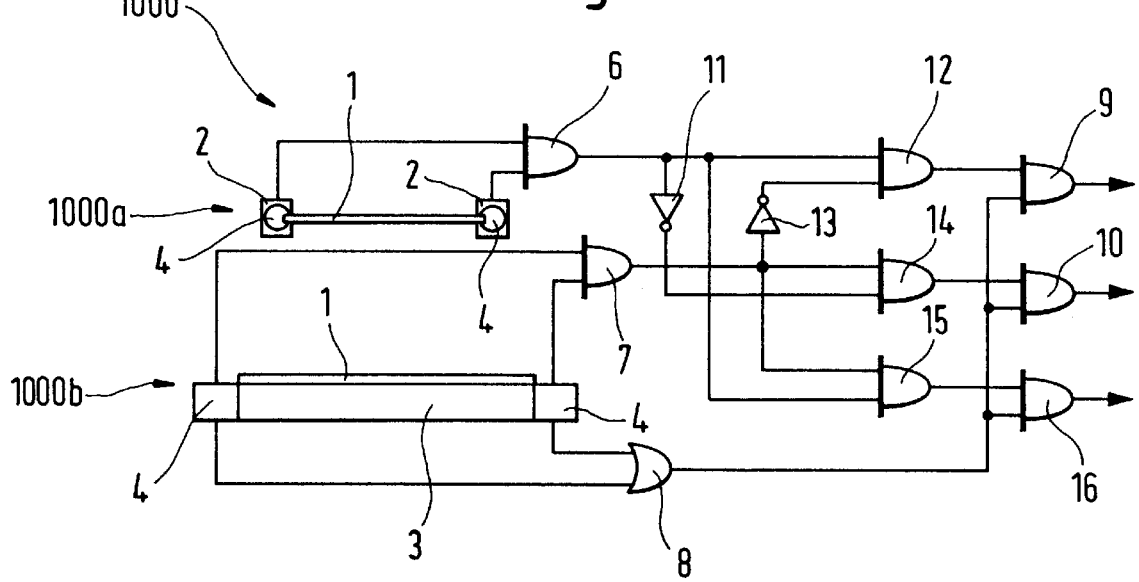
FIG. 23 is a block diagram showing the third embodiment of a signal processing

FIGS. 22 and 23 are block diagrams showing a third embodiment of a signal processing unit. In this embodiment, output signals from the first AND process units 6 are derived from detection signals of first layers 900a and 1000a.

First, correction and compensation of background data is explained. Here, the measurement of surface contamination on devices, objects, human bodies and the like caused by beta nuclide is assumed. In this case, gamma ray components are canceled for correction and compensation of background data. The basic concept of this embodiment is explained referring to FIG. 22.

A radiation detector 900 includes a first layer 900a which accepts incident radiation, and a second layer 900b which is disposed next to the first layer 900a. In an illustrative embodiment, the first layer 900a mainly detects both beta rays and gamma rays, and the second layer 900b mainly detects gamma rays. Detection is made for a certain period. If attribute ratios of the first layer 900a and the second layer 900b are defined by ($\beta+\gamma$) and ($\gamma'$), the attribute ratio of beta rays corrected by gamma rays component is obtained by:

$$\beta = (\beta+\gamma) - c1\cdot\gamma' \quad (1)$$

Here, c1 represents a correction coefficient.

In the detectors shown in FIGS. 22 and 23, by attributing output signals from the first AND process unit 6 and the second AND process unit 7 in a certain period thereby dividing by the period, ($\beta+\gamma$) and ($\gamma'$) can be derived. This process is one of many simple processes and can be applied to this embodiment.

Generally, it is practical to use a plastic for the scintillator 1. However, energy absorption of beta ray for such scintillator is approximately 2 MeV per 1 centimeter thickness. That is, if a scintillator having a thin thickness is used to restrain sensitivity of gamma rays, beta rays may penetrate the scintillator while reducing the inner energy thereof. This happens depending on the energy of beta rays.

In one embodiment, a scintillator is formed of plastic and has a thickness of 1–2 millimeters. The energy absorption of beta ray of such a scintillator is approximately 200 keV to 400 keV. Beta ray of Cobalt 60 (Co-60) has its maximum energy around 300 keV; therefore, most of the energy thereof is absorbed by the scintillator.

However, in the case where beta rays which have higher energy exist in the background, signals other than the signals to be attributed should be excluded from the output signals from the first AND process unit 6 and the second AND process unit 7.

For example, the measurement of surface contamination on walls and floors is assumed. Conventional materials used as walls and floors include Kalium 40 (K-40), which is a natural radioactive material. Therefore, beta rays which have a higher energy of 1.3 MeV are irradiated. On the other hand, beta rays of Cobalt 60, which may be a contamination source in nuclear facilities, have smaller energy such as 300 keV. Both of these nuclides irradiate gamma rays. Accordingly, it is considered that beta rays of Kalium 40, which has higher energy, should be excluded among beta rays while correcting data on gamma rays, similarly to the prescribed example.

Now, assume that the beta ray component of Cobalt 60 is "$\beta 1$", and the beta component of Kalium 40 is "$\beta 2$", respectively. All gamma ray components are assumed to have the "$\gamma$" component in common. In this case, the detected signals from the first layer 900a include $\beta 1$, $\beta 2$ and $\gamma$, and the detected signals from the second layer include $\beta 2$ and $\gamma$.

Here, it is a high probability that $\beta 2$ is detected both in the first layer 900a and the second layer 900b. However, the probability that $\gamma$ is detected both in the first layer 900a and the second layer 900b is low, because a plastic reacts to gamma rays with low probability, and a thin scintillator lacks sufficient section area for the reaction to gamma ray.

Based on the above-described characteristic, it is efficient to regard beta ray components which are detected by both the first and second layers 900a and 900b such that they are always $\beta 2$, and thereby omitting them in advance from the following calculations. As shown in FIGS. 22 and 23, $\beta 2$ having higher energy may be excluded from output signals from the first layer 900a and the second layer 900b. This is done by applying output signals from the first AND process unit 6 and from the second AND process unit 7 via the inverse process unit 13 to the fifth AND process unit 12, and then by applying output signals from the fifth process unit 12 to the third process unit 9. Accordingly, detection result which shows exactly $\beta 1$ by excluding most of $\beta 2$ can be obtained, by considering the attribute ratio derived from output signals of the third AND process unit 9.

The $\beta 2$ may be included in detected signals from the second layer 900b. In order to obtain $\beta 2$, a structure as shown in FIGS. 22 and 23 is used. That is, output signals from the first AND process unit 6 and the second AND process unit 7, which are output from the first layer 900a and the second layer 900b respectively, are applied to the seventh AND process unit 15, thereby executing detection simultaneously. Then, the output signals from the seventh AND process unit 15 and from the first OR process unit 8, which is used to add position information, are applied to the eighth AND process unit 16, thereby obtaining information on $\beta 2$.

If $\beta 2$ is detected in advance under the condition of $\beta 1$, and the attribute ratio of $\beta 2$ to the first layer 900a is studied, the correction while detecting beta rays can be realized. This can be made when the eighth AND process unit 16 is used, as shown in FIGS. 22 and 23.

In order to obtain components other than $\beta 2$, a signal process step described below can be used. That is, it is done by applying output signals from the first AND process unit 6 via the first inverse process unit 11 and from the second process unit 7 to the sixth AND process unit 14, and then by applying output signals from the sixth process unit 14 and the first OR process unit 8, which is used to add position information, to the fourth AND process unit 10. Thereby, output signals in which gamma rays are predominant and the $\beta 2$ components are excluded can be obtained.

Accordingly, the third AND process unit 9 produces output signals in which β2 is excluded and β1 is predominantly position information, the fourth AND process unit 10 produces output signals in which β2 is excluded and γ is predominantly position information, and the eighth AND process unit 16 produces output signals in which β2 is predominantly position information, respectively.

Accordingly, an equation (2) expressed below can be derived when the attribute ratio is calculated using the above-described output signals:

$$A(B) = A(\beta 1) - c1 \cdot A(\gamma) - c2 \cdot A(\beta 2) \quad (2)$$

Here, A(β1) represents the detection result of the third AND process unit 9, A(γ) represents the detection result of the fourth AND process unit 10, A(β2) represents the detection result of the eighth AND process unit 16, c1 represents the efficiency ratio of γ of the first layer and the second layer, c2 represents the efficiency ratio of β2 of the first layer and the second layer. Equation (1) can derive accurate A(β).

If detection objects include α rays, neutron rays and the like under γ background, a signal process step as shown in FIGS. 22 and 23 can also be applied.

Regarding the fifth AND process unit 12 and the sixth AND process unit, the terminals thereof connected to the first inverse process unit 11 and the second inverse process unit 13 alternatively may be coupled to "TRUE". Further, the seventh AND process unit 15 and the eighth AND process unit 16 may be omitted. These changes can be made depending on the object that is to be detected and the background.

According to the present invention, a radiation detector capable of detecting radiation in a large area is provided. Further, a radiation detector capable of executing two-dimensional detection while correcting and compensating data from the background radiation is provided.

The foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting, of the scope of the invention, which is set forth in the following claims. Thus, the present invention may be embodied in various ways within the scope of the spirit of the invention. The entire contents of Japanese Patent Application H11-158211, filed Jun. 4, 1999, are incorporated herein by reference.

What is claimed is:

1. A radiation detector, comprising:
   a scintillator that generates scintillated light in response to radiation received on a first surface of the scintillator;
   a first light guide connected to a side edge of the scintillator, said first light guide having a fluorescence characteristic;
   a plurality of second light guides having a common surface arranged at a second surface of the scintillator opposite the first surface, each of the plurality of second light guides having a fluorescence characteristic; and
   a plurality of photo detectors, a corresponding one of the plurality of photo detectors being connected to the first light guide or the second light guide for detecting a fluorescent light therein.

2. The radiation detector according to claim 1, further comprising a signal processing unit that processes a signal generated by the photo detector in response to said detected fluorescent light.

3. The radiation detector according to claim 1, wherein the first light guide irradiates a fluorescent light which has wavelength different than the wavelength of the scintillated light from the scintillator.

4. The radiation detector according to claim 1, wherein the second light guide has a surface larger than that of the first light guide.

5. The radiation detector according to claim 4, wherein each of the plurality of second light guides is formed of a plate.

6. The radiation detector according to claim 5, wherein the second light guide has a major edge and a minor edge, and the minor edge defines a resolution of detection.

7. The radiation detector according to claim 6, wherein the major edge of the second light guide has approximately the same length as an edge of the scintillator.

8. The radiation detector according to claim 1, wherein said one of the photo detectors is connected to an end of the first light guide or the second light guide.

9. The radiation detector according to claim 8, wherein the photo detector is connected at least one end of the first light guide.

10. The radiation detector according to claim 9, further comprising a reflective material connected to the other end of the first light guide for blocking transmission of the fluorescent light from said other end.

11. The radiation detector according to claim 1, wherein the first light guide has a prismatic shape.

12. The radiation detector according to claim 1, wherein the first light guide has a circular shape.

13. The radiation detector according to claim 12, wherein the first light guide includes an optical fiber.

14. The radiation detector according to claim 1, wherein the scintillator includes a plurality of unit scintillators.

15. The radiation detector according to claim 14, further comprising a third light guide for connecting the unit scintillators to each other.

16. The radiation detector according to claim 15, wherein the third light guide guides each collect scintillated light from the connected scintillators independently.

17. The radiation detector according to claim 16, wherein the third light guide includes a reflective material.

18. The radiation detector according to claim 16, wherein another photo detector is connected to at least one end of the third light guide.

19. The radiation detector according to claim 15, wherein the third light guide is arranged parallel to the first light guide.

20. The radiation detector according to claim 19, wherein the first light guide and the third light guide are arranged perpendicular to the second light guide.

21. The radiation detector according to claim 19, further comprising a plurality of layers including a unit scintillator and a third light guide.

22. The radiation detector according to claim 21, wherein the unit scintillators in the layers are arranged parallel to each other.

23. A radiation detector according to claim 1, wherein the first light guide covers substantially all of the side edge of the scintillator.

24. A radiation detector, comprising:
    a first detecting layer having a plurality of first scintillators and a light guide, each of the first scintillators generating a scintillated light in response to radiation received on a first surface thereof, the light guide having a fluorescence characteristic and being connected to side edges of the first scintillators; and a second detecting layer arranged adjacent a second surface of the first detecting layer opposite the first surface, said second detecting layer having a plurality of second scintillators and a plurality of second light guides, each second scintillator generating a scintillated light in response to received radiation, each of the second light guides having a fluorescence characteristic.

25. The radiation detector according to claim 24, further comprising a photo detector connected to the light guide and the second light guide for detecting a fluorescent light therein.

26. The radiation detector according to claim 24, wherein the second scintillator is disposed on the opposite side of the surface of the scintillator where radiation is received.

27. The radiation detector according to claim 24, wherein the second light guide is disposed on the opposite side of the surface of the scintillator where radiation is received.

28. A radiation detector according to claim 24, wherein the first light guide covers substantially all of the side edge of the scintillator.

29. A radiation detector, comprising:
    an essentially flat scintillator having a first major surface, a second and opposite major surface and a side edge interconnecting the first major surface with the second major surface;
    a light guide disposed along the side edge of the scintillator so as to collect light which has reflected back and forth between the first and second major surfaces;
    a first photo detector connected to the first light guide;
    a plurality of second light guides arranged adjacent the second major surface; and
    a plurality of second photo detectors each connected to a second light guide.

30. The radiation detector comprising:
    a scintillator that generates scintillated light in response to radiation received on a first surface of the scintillator;
    a first light guide connected to the scintillator and having a fluorescence characteristic;
    a plurality of second light guides having a common surface arranged at a second surface of the scintillator opposite the first surface, each of the plurality of second light guides having a fluorescence characteristic; and
    a plurality of photo detectors, a corresponding one of the plurality of photo detectors being connected to the first light guide or the second light guide for detecting a fluorescent light therein;
    wherein the second light guide has a surface larger than that of the first light guide;
    wherein each of the plurality of second light guides is formed of a plate;
    wherein the second light guide has a major edge and a minor edge, and the minor edge defines a resolution of detection;
    wherein the major edge of the second light guide has approximately the same length as an edge of the scintillator; and
    wherein the scintillator has a surface in which the length of edges there is approximately 600 millimeters, and the second light guide has a surface in which the length of edges thereof is approximately 100 millimeters and 600 millimeters.

* * * * *